United States Patent [19]

Aotsu et al.

[11] 4,245,182
[45] Jan. 13, 1981

[54] EXCITATION CONTROL APPARATUS FOR A GENERATOR

[75] Inventors: Hiroaki Aotsu, Nakaminato; Akira Isono, Hitachi; Masuo Goto, Hitachi; Koichi Kimura, Hitachi; Yasushi Momochi, Hitachiota; Takaaki Kai, Ibaraki; Satoshi Kitamura; Akihisa Kaihara, both of Hitachi; Hirosi Okada, Katsuta, all of Japan

[73] Assignees: Hitachi, Ltd.; Hitachi Engineering Co., Ltd., both of Japan

[21] Appl. No.: 891,001

[22] Filed: Mar. 28, 1978

[30] Foreign Application Priority Data

Mar. 30, 1977 [JP] Japan .................................. 52-34500

[51] Int. Cl.³ .............................................. H02P 9/14
[52] U.S. Cl. ........................................ 322/20; 322/24; 322/25; 322/27; 307/84
[58] Field of Search .................................. 322/17–25, 322/28, 14, 27; 307/84

[56] References Cited

U.S. PATENT DOCUMENTS

| | | | |
|---|---|---|---|
| 3,634,750 | 1/1972 | Bobo | 322/20 |
| 3,656,048 | 4/1972 | Hauf | 322/20 X |
| 3,737,760 | 6/1973 | Kiwaki et al. | 322/28 |
| 3,996,507 | 12/1976 | Chambers | 322/20 |
| 4,044,296 | 8/1977 | Dhyanchand et al. | 322/25 |

Primary Examiner—Robert J. Hickey
Attorney, Agent, or Firm—Craig & Antonelli

[57] ABSTRACT

A field control apparatus for a generator having a field winding comprises a terminal voltage control unit for controlling a field current of the generator in accordance with a difference between a terminal voltage signal of the generator and a reference voltage signal, which control unit has at least one of a line drop compensation function, an under-excitation limitation function, an over-excitation limitation function, a power factor regulation function, an armature winding overcurrent compensation function and a cross-current compensation function. The field control apparatus includes a detector as a common signal source for detecting active power and reactive power components at an output terminal of the generator and means responsive to the output of the detector for performing scalar operation in accordance with a function of the added compensation/control function described above. An output of the operating means is added to the differential signal as an added function signal to control the field current for excitation of the field winding.

17 Claims, 23 Drawing Figures

F I G. 6a
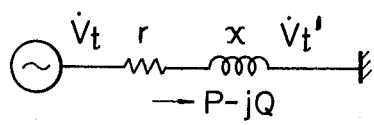
F I G. 6b
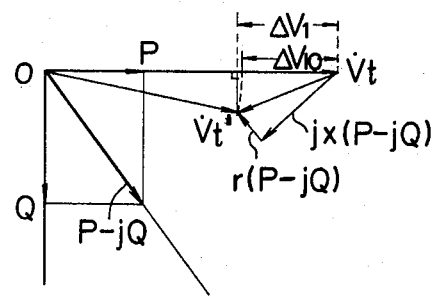
F I G. 7
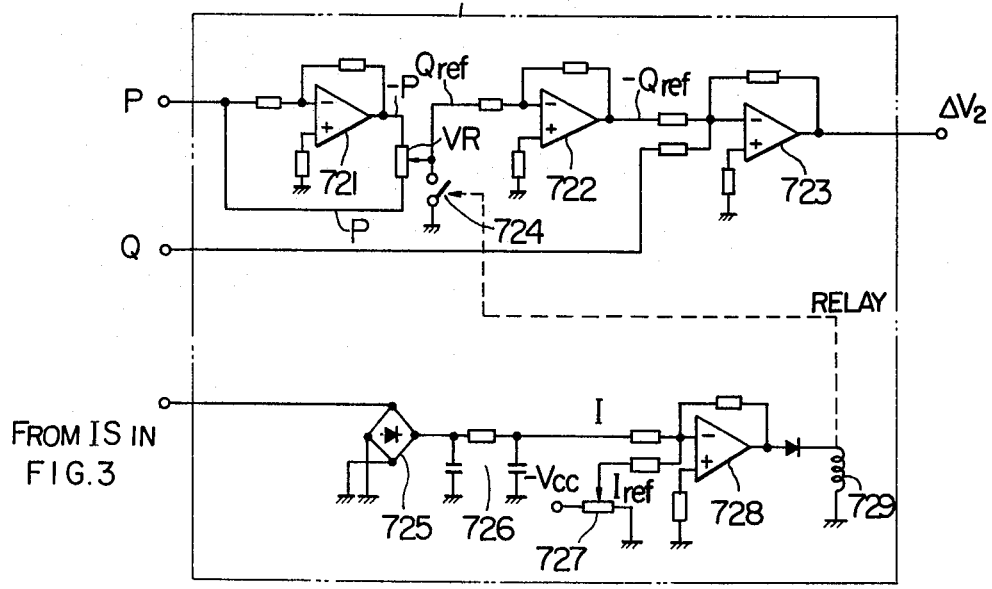

F I G. 17
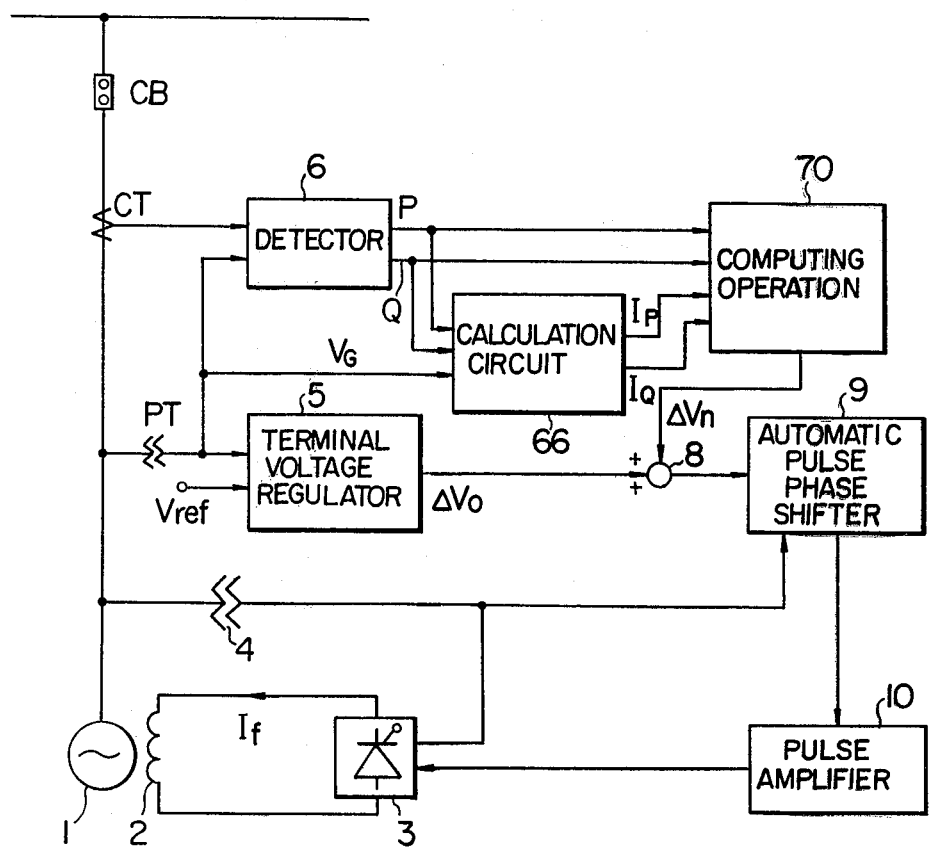

F I G. 18
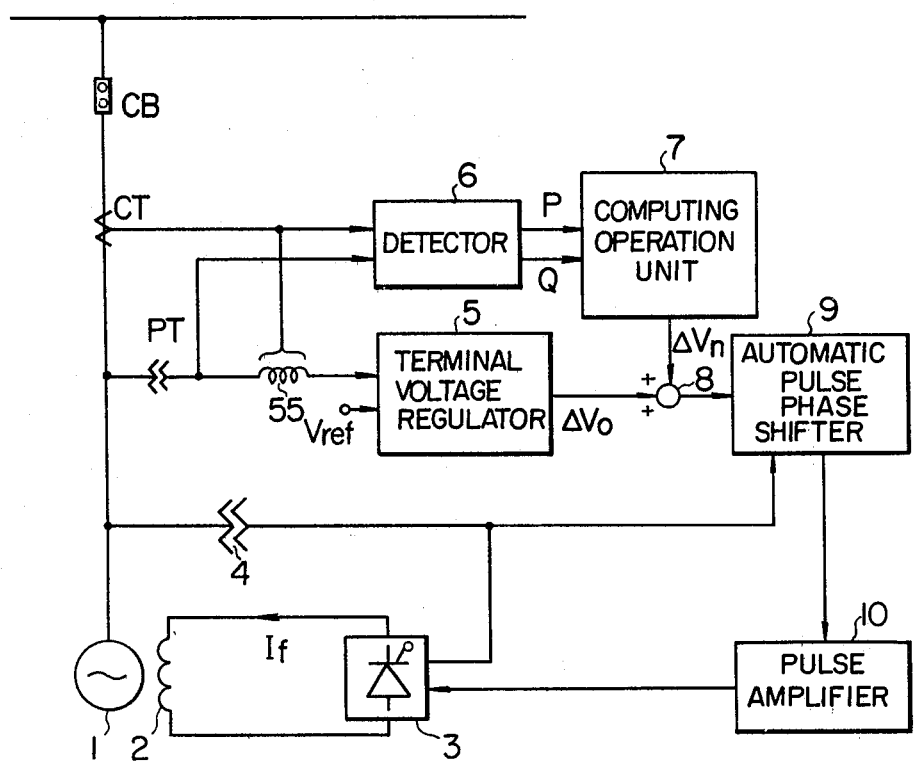

F I G. 19
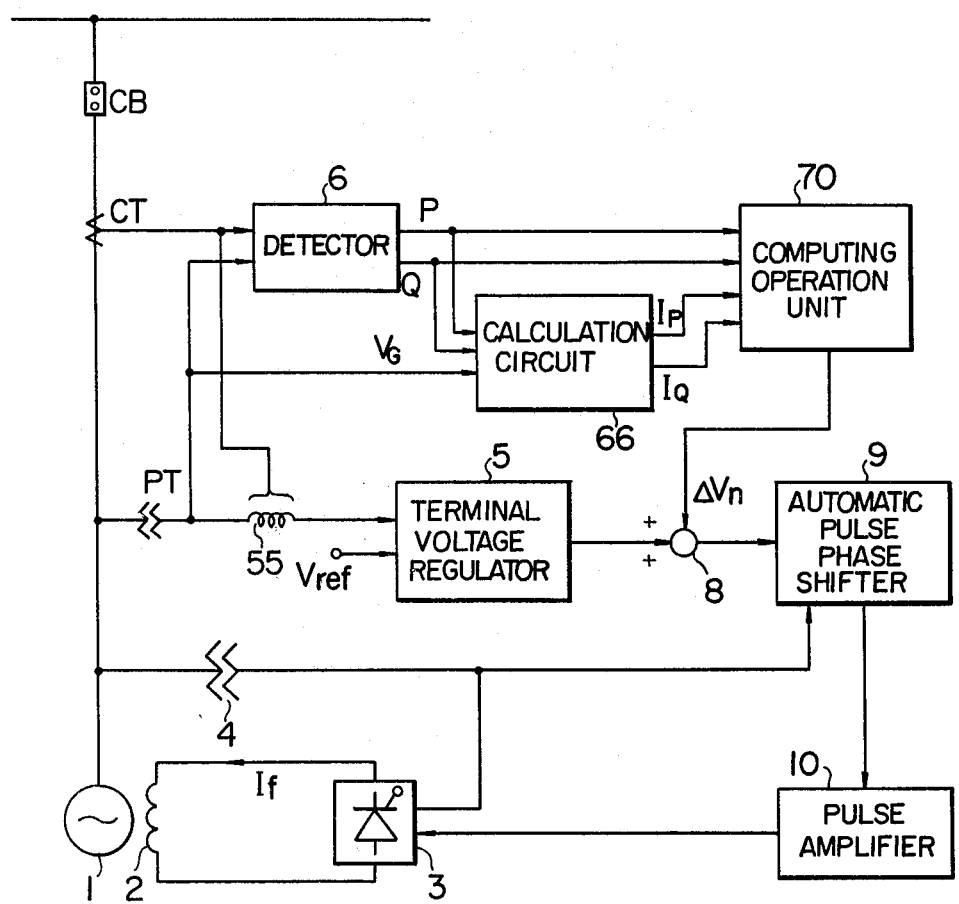

EXCITATION CONTROL APPARATUS FOR A GENERATOR

The present invention relates to an excitation control apparatus for synchronous machines such as alternating current generators, and more particularly to an excitation control apparatus used to control a field of the generator under various conditions.

An excitation control apparatus for an A.C. generator usually includes a terminal voltage control unit for controlling a field in accordance with a difference between a terminal voltage signal of the generator and a reference voltage signal in order to stabilize a system to be connected to the generator, and the terminal voltage control unit includes an automatic voltage regulator (AVR) for controlling an exciting apparatus. In many cases, the excitation control apparatus for the generator actually has various compensation and control functions for the varying operating factors in addition to the terminal voltage regulation function to the generator. Such functions are (a) a line drop compensation function for compensating for line drop at the output of the generator, (b) a cross-current compensation function for suppressing a cross current between generators when a plurality of generators are connected in parallel in a system, (c) an under-excitation limiting function for preventing heating of a field winding of the generator and maintaining the stability of the system, (d) an over-excitation limiting function for preventing heating of the field winding of the generator, (e) a power factor regulation function for maintaining a constant power factor operation of the generator, and/or (f) an overcurrent compensation function for compensating for an overcurrent of an armature winding of the generator. Many excitation control apparatus for a generator usually have some of these functions.

Heretofore, these compensation/control functions have been attained by the combination of signals based on a vector operation through a combination of electromagnetic circuit components such as a potential transformer, current transformer, reactor or resistor. By way of example, the under-excitation limiting function described above is explained. As disclosed in Japanese Patent Publication No. 44-15867 issued July 14, 1969 and assigned to the present assignee, respective phases of a 3-phase alternating current fed from the generator are represented by R, S and T. A voltage $\dot{V}_{RT}$ of R-T phase is detected through a potential transformer PT connected to the output terminal of the generator. The detected voltage $\dot{V}_{RT}$ is divided into $\dot{V}_1{}'$ and $\dot{V}_2{}'$ by a potentiometer and a resistor. On the other hand, a current $\dot{I}_C$ of S-phase is detected through a current transformer CT connected to the output terminal of the generator and directed to a series circuit of a reactor and a resistor to produce a compensation voltage $\dot{V}_C$ for a vector operation. The voltages $\dot{V}_1{}'$, $\dot{V}_2{}'$ and $\dot{V}_C$ are vector-operated to produce resultant voltages $\dot{V}_1$ and $\dot{V}_2$, which are then converted to scalar quantities $|\dot{V}_1|$ and $|\dot{V}_2|$, respectively, through an auxiliary potential transformer and a rectifier circuit. The scalar voltages $|\dot{V}_1|$ and $|\dot{V}_2|$ are applied across a series circuit of resistors so that a difference $\Delta V$ between those voltages is produced at the junction of the resistors, in accordance with the following equation:

$$\Delta V = |\dot{V}_1| - |\dot{V}_2| \qquad (1)$$

The excitation of the generator is controlled based on the differential voltage $\Delta V$ so that the generator is protected against under-excitation. Thus, the potential transformer and the current transformer used to carry out the vector operation in producing the resultant voltages $\dot{V}_1$ and $\dot{V}_2$ cannot be used in common to a potential transformer for detecting the terminal voltage or a current transformer for the other function. While the under-excitation limiting function was applied above, other functions can be explained similarly.

As described above, many excitation control apparatus for the generator have some of the plurality of functions described above. The particular functions are determined by the respective excitation control apparatus and are not uniformly determined. Accordingly, in the prior art excitation control apparatus, the potential transformer, current transformer, reactor or resistor must be included separately for each of the compensation/control function units included. As a result, the wiring of the controller to the generator is troublesome and the system must be large and expensive.

Furthermore, it has not been easy to add a desired compensation/control function or to replace the unit when it is unserviceable.

An example of using an automatic voltage regulator in the field control for a synchronous machine including a generator is disclosed in the U.S. Pat. No. 3,634,750 to Bobo.

An object of the present invention is to provide an excitation control apparatus for a generator which overcomes the drawbacks encountered in the prior art apparatus, has multiple functions, is of small size and inexpensive.

Another object of the present invention is to provide an excitation control apparatus which allows the addition of a compensation/control function of a generator system and is easy to maintain.

Another object of the present invention is to provide an excitation control apparatus for a generator which includes a detector for detecting an active power component and a reactive power component from a common potential transformer and current transformer connected to an output terminal of the generator to produce a compensation/control function signal from an output of the detector.

Another object of the present invention is to provide an excitation control apparatus for a generator which can be semiconductorized except transformers for detecting a terminal voltage and a terminal current of the generator.

The present invention will be explained in detail hereinafter. In essence, the present invention has been made based on the results of comparative consideration of the various functions included in the excitation control apparatus of the generator. From the mathematical analysis of the various functions, it has been found that the functions other than that of the control unit for the terminal voltage of the generator could be expressed in the form of functions of the active power P and the reactive power Q at the output terminal of the generator and they could be obtained by a scalar operation. Accordingly, the respective functions can be obtained by a detection means for the active power P and the reactive power Q which may be a common signal source and a means for carrying out the scalar operation for the respective functions in response to the output of the detection means. Thus, no separate components such as several transformers other than CT and PT in a vector operation circuit for each function are required.

These and other objects, features and advantages of the present invention will be apparent from the following description of the preferred embodiments of the invention when taken in conjunction with the accompanying drawings.

FIGS. 6a and 6b illustrate a line drop compensation function;

FIG. 7 shows a circuit configuration of a power factor regulator;

Figure 20:
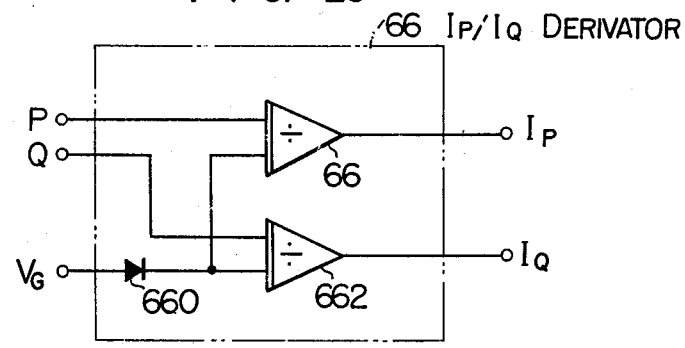
Figure 21:
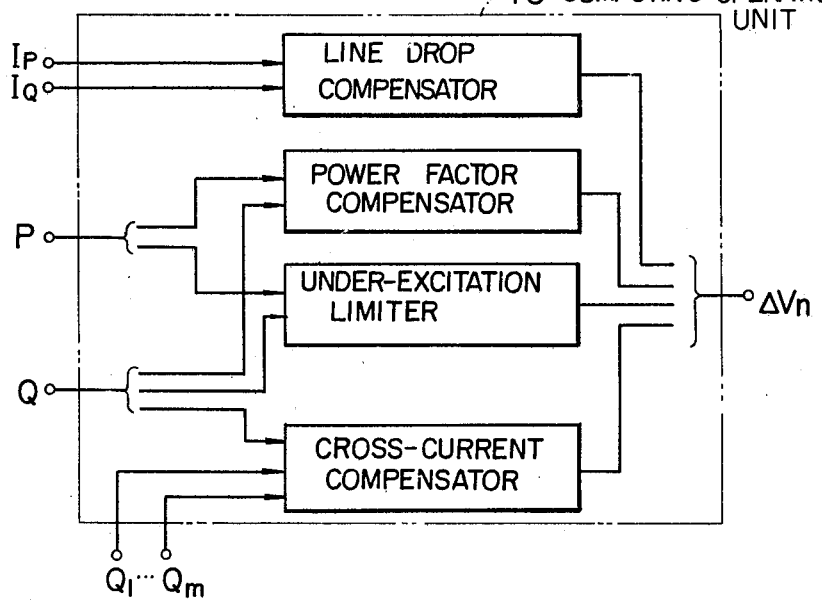

FIGS. 16 to 19, and 22 show other embodiments of the present invention;

FIG. 20 shows an example of an active and reactive current component detector; and FIG. 21 shows another embodiment of the operation circuit.

Figure 1:
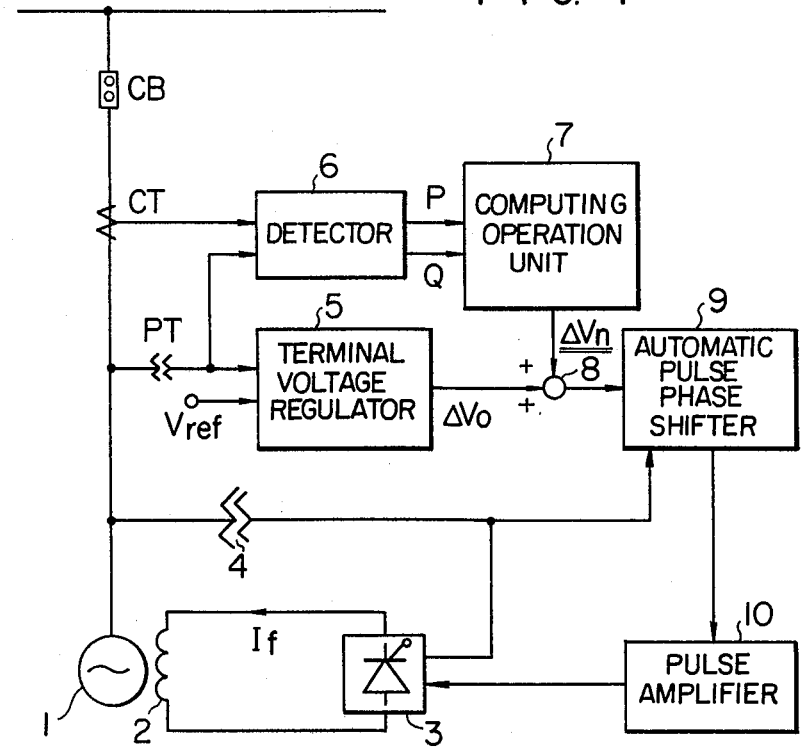
FIG. 1 is a block diagram showing one embodiment of an excitation control apparatus for a generator according to the present invention.

FIG. 1 shows an embodiment of an excitation control apparatus for a generator in accordance with the present invention. In FIG. 1, numeral 1 denotes a generator, 2 a field winding of the generator 1, 3 a rectifier such as a thyristor for supplying a D.C. current to the field winding 2, 4 a transformer for the rectifier 3, CB a circuit breaker, PT a potential transformer, CT a current transformer, $V_{ref}$ a reference voltage supplied from a constant voltage means, 5 a terminal voltage regulator having a voltage comparator, 6 a detector for detecting active power P and reactive power Q, 7 a computing operation unit for carrying out operations in accordance with respective functions in response to an output of the detector 6 based on relations determined as a function of the active power component and the reactive power component at the output of the generator, for the compensation/control function of the generator system, numeral 8 denotes an adder, 9 an automatic pulse phase shifter to which an output of the transformer 4 is applied to synchronize the shifter 8 therewith, and 10 a pulse amplifier. The details of the automatic pulse phase shifter are disclosed in Japanese Patent Publication No. 50-28233 issued Sept. 12, 1975 and assigned to the present assignee.

The operation of the circuit configuration is now explained with reference to FIG. 1.

A terminal voltage of the generator 1 is kept constant by a current flowing in the field winding 2. If any voltage swing or fluctuation occurs in the system for any reason, it is detected by the potential transformer PT. The voltage detected by the potential transformer PT is applied to the terminal voltage regulator 5, in which it is compared with a reference voltage. The terminal voltage regulator 5 compares those voltages and produces a differential voltage $\Delta V_O$. In response to the differential voltage $\Delta V_O$, the automatic pulse phase shifter 9 applies a control pulse to a control electrode of the rectifier 3 through the pulse amplifier 10 to control a firing phase of the rectifier 3. As a result, the field of the generator 1 changes abruptly so that the terminal voltage of the generator changes to suppress the voltage swing. The above construction and operation are similar to those of a prior art apparatus and hence they are not explained in detail. A hunting prevention function may be included in the circuit.

As described above, the excitation control apparatus for the generator includes several other compensation/control functions for the operation of the generator system. These functions can be attained based on the active power P and the reactive power Q at the output of the generator. The detector 6 detects the terminal voltage and the terminal current of the generator through the terminal voltage detecting potential transformer PT and the terminal current detecting current transformer CT, respectively, and produces a scalar signal P representative of the active power and a scalar signal Q representative of the reactive power. The signals P and Q are applied to the computing operation unit 7 which has operation units to carry out the respective compensation/control functions. It carries out the respective functions based on the signals P and Q, adds the result of the operations and produces a correction voltage $\Delta V_n$ for the compensation or control. In the illustrated embodiment, the operation unit 7 is an analog computing unit comprising operational amplifiers. It will be apparent to those skilled in the art from the description of the configuration of the compensation/control function operation unit to be described later that the operation unit 7 may be a 16-bit microcomputer when the output of the detector 6 is A-D converted. In this A-D converted case, it should be understood that the differential output of the regulator 5 is also digitalized before it is added with the output of the operation unit 7.

Like the differential voltage $\Delta V_O$, the voltage $\Delta V_n$ is also applied to the automatic pulse phase shifter 9 to control the firing phase of the rectifier 3. In FIG. 1, the voltages $\Delta V_n$ and $\Delta V_O$ are added together by the adder 8 and the sum thereof is applied to the automatic pulse phase shifter 9. Details of the respective units are explained below.

Figure 2:
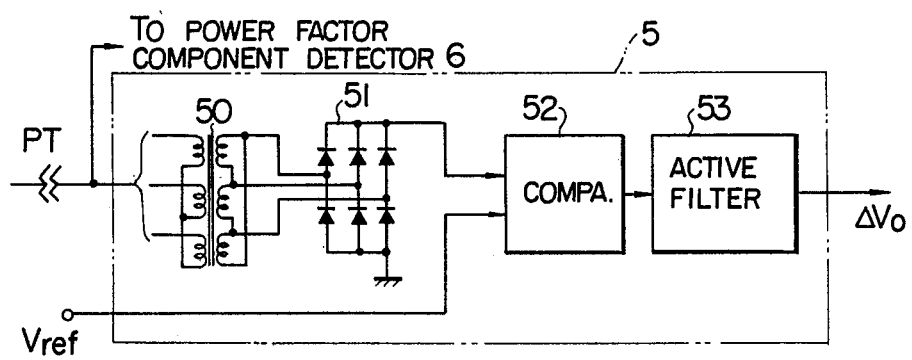
FIG. 2 shows a circuit configuration of a terminal voltage regulator.

Terminal voltage regulator 5: It is of well known type and comprises a transformer 50, a rectifying circuit 51, a compare circuit 52 and an active filter 53 as shown in FIG. 2. The A.C. voltage detected by the potential transformer PT is rectified by the rectifying circuit 51. The compare circuit 52 compares the rectified voltage with the reference voltage $V_{ref}$ to produce a differential voltage, which is applied to the active filter 53 in which high frequency components are eliminated. The output from the active filter 53 constitutes the differential voltage signal $\Delta V_O$.

Figure 3:
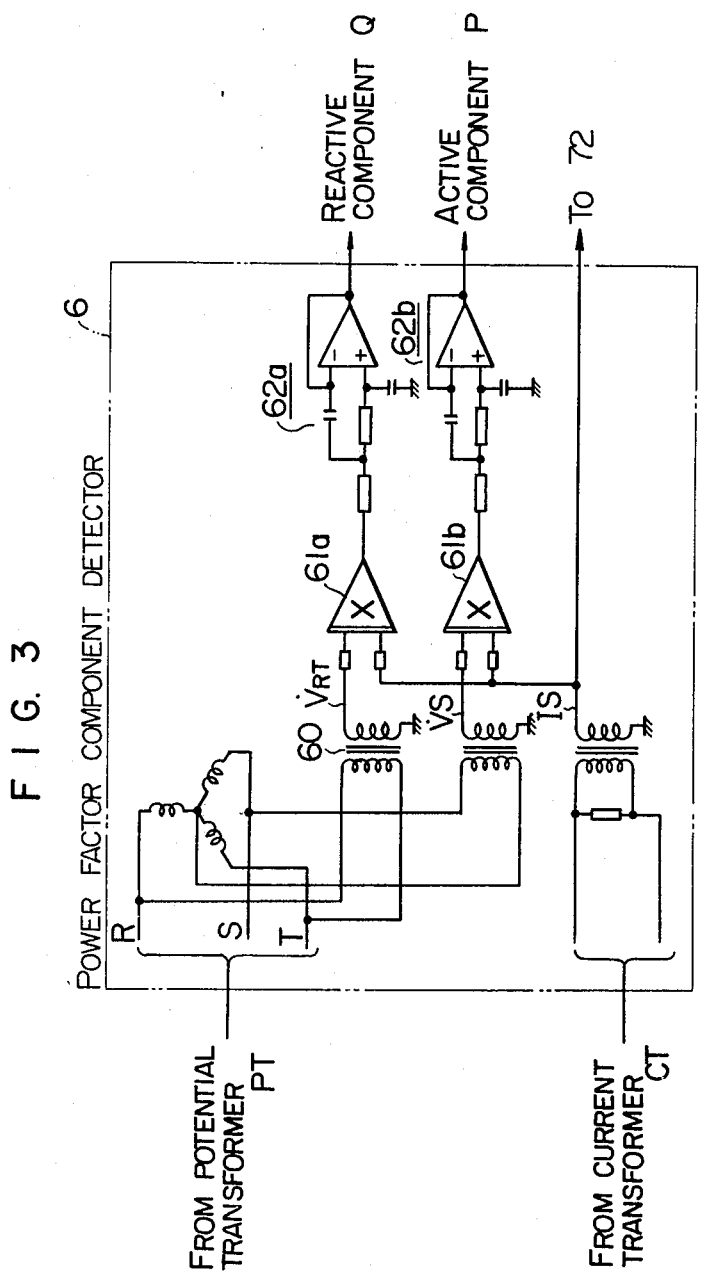
FIG. 3 shows a circuit configuration of a P-Q detector.

Detector 6: FIG. 3 shows a configuration of the detector 6 for detecting the active power P and the reactive power Q. In FIG. 3, numeral 60 denotes a transformer, 61a and 61b multipliers each comprising an operational amplifier which receives input signals through resistors, and 62a and 62b active filters each comprising an operational amplifier, resistors and capacitors. An R-T phase line voltage $V_{RT}$ and an S-phase phase voltage $V_S$ are derived from the three-phase A.C. voltage from the potential transformer PT, by the transformer 60. The current transformer CT is connected to the S-phase of the generator output. An S-phase current $I_S$ is derived from the current transformer CT. Thus, the active power P is derived in the form of a D.C. voltage signal from the multiplier 61b and the active filter 62b based on the voltage $V_S$ and the current $\dot{I}_S$. The reactive power Q is derived in the form of a D.C. voltage signal from the multiplier 61a and the active filter 62a based on the voltage $V_{RT}$ and the current $I_S$. Accordingly, the outputs of the detector are scalar signals.

Figure 4:
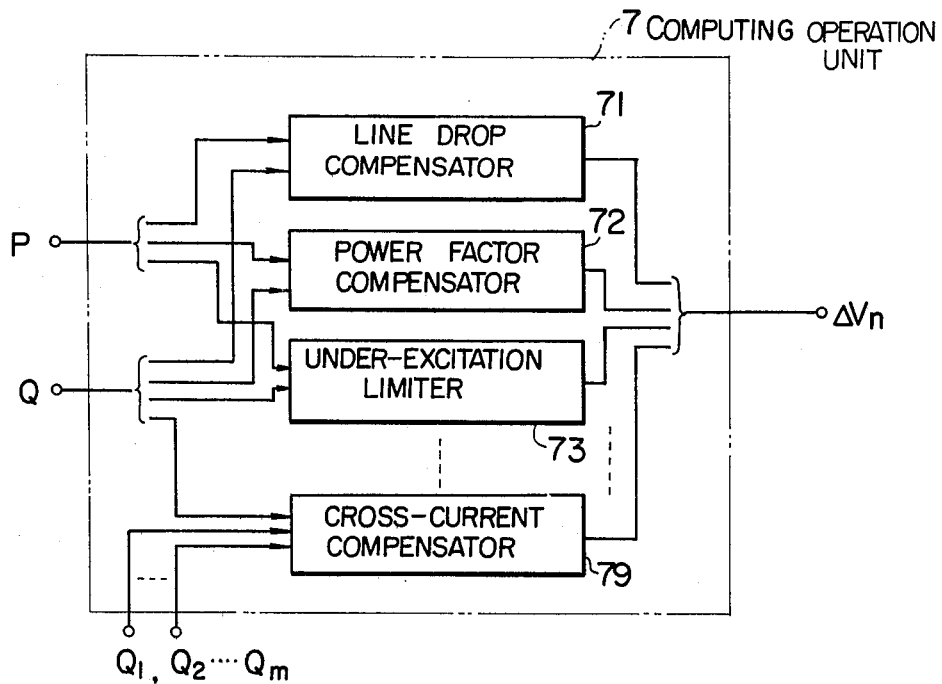
FIG. 4 shows an operation circuit for performing various functions.

Computing operation unit 7: FIG. 4 shows a configuration of the computing operation unit 7. In FIG. 4, numerals 71 to 79 denote functional blocks included in the excitation control apparatus. The operation unit 7 receives the active power signal P and the reactive power signal Q derived from the detector 6. The active power signal P and the reactive power signal Q are applied to the functional blocks 71 to 73 but only the reactive power signal Q is applied to the functional block 79. The functional block 79 will be described hereinafter in detail. It has a function of compensating for a cross current between generators when a plurality of generators are connected in parallel. Accordingly, the reactive powers $Q_1, \ldots, Q_m$ of the other generators should be considered. A combined output $\Delta V_n$ of the respective functional blocks 71 to 79 together with the output $\Delta V_O$ of the terminal voltage regulator is applied to the automatic pulse phase shifter 9 as a compensation/control signal. Each of the functional blocks is explained in detail.

Figure 5:
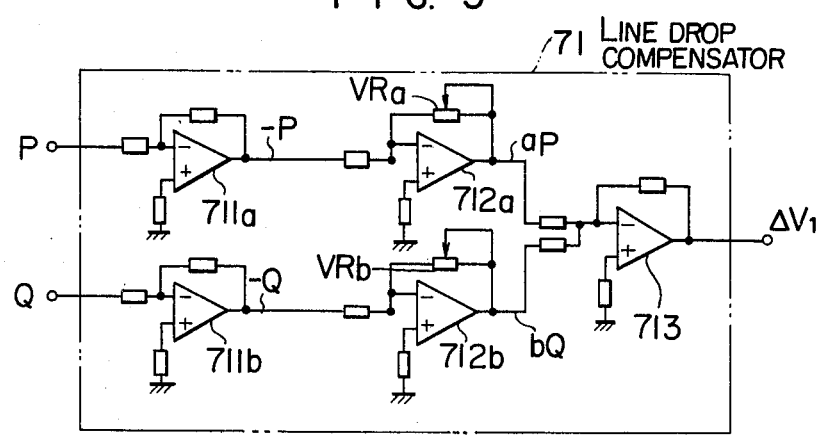
FIG. 5 shows a circuit configuration of a line drop compensation unit.

Functional block 71: It has a line drop compensation function i.e., an impedance drop compensation function. FIG. 5 shows a circuit configuration thereof and FIGS. 6a and 6b illustrate the function. In FIG. 5, numerals 711a and 711b denote phase inverters each comprising an operational amplifier and resistors, numerals 712a, 712b and 713 denote operation circuits each comprising an operational amplifier and resistors, and $VR_a$ and $VR_b$ denote potentiometers. The operation is explained below. The block 71 receives the active power signal P and the reactive power signal Q derived from the detector 6. The active power signal P and the reactive power signal Q are inverted to $-P$ and $-Q$ by the inverters 711a and 711b, respectively. The operation circuits 712a and 712b multiply the inverted signals $-P$ and $-Q$ by the amplification factor of $-a$ and $-b$, respectively, set by the potentiometers $VR_a$ and $VR_b$, to produce the outputs aP and bQ, respectively. The amplification factors $-a$ and $-b$ are determined by setting the potentiometers $VR_a$ and $VR_b$, respectively, based on a resistive component r and a reactive component x of a line to be compensated. The signals aP and bQ are applied to the operation circuit 713 which functions as an adder to produce a line drop compensation voltage $\Delta V_1$ by the following equation:

$$\Delta V_1 = aP + bQ \quad (2)$$

The line compensation voltage $\Delta V_1$ is further explained with reference to FIGS. 6a and 6b, in which $\dot{V}_t$ denotes the terminal voltage of the generator, $\dot{V}_t'$ denotes a terminal voltage of the generator in an infinite bus which is derived from the line resistance r and the line reactance x. As is seen from FIG. 6b, a true compensation voltage $\Delta V_{10}$ is given by the following equation:

$$\Delta V_{10} = |\dot{V}_t| - |\dot{V}_t'| \quad (3)$$

Therefore, the compensation voltage $\Delta V_1$ derived from the block 71 is not a true compensation voltage. However, the difference between the compensation voltages $\Delta V_1$ and $\Delta V_{10}$ is small or it is within 10% of a rated voltage at a maximum compensation capacity. Therefore, the difference may be practically negligible. Thus, the block 71 is not constructed to carry out the vector operation as shown in the equation (3) but is constructed to carry out the scalar operation as shown in the equation (2). No practical problem occurs when the approximate compensation voltage in accordance with the equation (2) is used.

Figure 8:
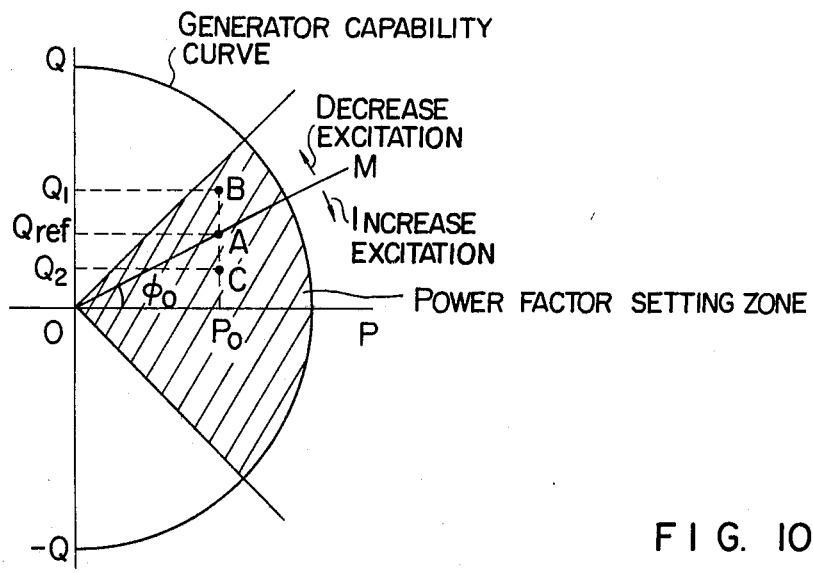
FIG. 8 is a diagram illustrating a power factor regulation function.

Functional block 72: It has a power factor regulation function for maintaining a constant power factor operation of the generator. FIG. 7 shows a circuit configuration therefor and FIG. 8 illustrates the function. In FIG. 7, numerals 721 and 722 denote inverters each comprising an operational amplifier and resistors, 723 denotes an operation circuit for adding operation, and VR denotes a potentiometer. The operation is explained below. The block 72 receives the active power signal P and the reactive power signal Q derived from the detector 6. The active power signal P is inverted to $-P$ by the inverter 721. As a result, the signals P and $-P$ are applied across the potentiometer VR. The output of the potentiometer VR, that is, a reference reactive power $Q_{ref}$ is expressed as follows:

$$Q_{ref} = aP \quad (4)$$

where a is a division ratio of the potentiometer VR and $|a| \leq 1$. Thus, if the division ratio a of the potentiometer VR is set to a constant $a_O$, $Q_{ref}$ always satisfies the following relation to any value of $P_O$.

$$\tan\phi_O = a_O = Q_{ref}/P_O = \text{constant} \quad (5)$$

where $\phi_O$ is a power factor angle which is a reference in deriving the reactive power $Q_{ref}$ for a given $P_O$. The $Q_{ref}$ thus derived is inverted to $-Q_{ref}$ by the inverter 722. The reference reactive power signal $-Q_{ref}$ and the reactive power signal Q derived from the detector 6 are applied to the operation circuit 723, which produces a control voltage $\Delta V_2$ to be applied to the adder 8 based on the signals $-Q_{ref}$ and Q.

$$\Delta V_2 = K_2(Q_{ref} - Q) \quad (6)$$

where $K_2$ is a positive constant. Thus, if the signal Q corresponding to the active power $P_O$ in any operating condition is larger than $Q_{ref}$ ($Q > Q_{ref}$), $\Delta V_2$ is negative ($\Delta V_2 < O$) and a "decrease excitation" command is issued, and if $Q > Q_{ref}$, $\Delta V_2$ is positive ($\Delta V_2 > O$) and an "increase excitation" command is issued. FIG. 8 illustrates the conditions described above in the form of P-Q coordinates. In FIG. 8, an abscissa represents the active power P, an ordinate represents the reactive power Q, a semi-circle represents a generator capability curve, a straight line OM represents an operating line for a constant power factor cos $\phi_O$, and a hatched area represents a power factor setting area. If the respective power Q corresponding to any active power $P_O$ is equal to $Q_{ref}$, the operating point of the generator is at a point A in FIG. 8 and a constant power factor operation is maintained. However, if the reactive power Q is equal to $Q_1$, the operating point of the generator is at a point B and the constant power factor operation is not maintained. In this case, since $Q_1 > Q_{ref}$, the functional block 72 issues the "decrease excitation" signal $\Delta V_2$ for decreasing the excitation to the excitation winding of the generator. The signal $\Delta V_2$ is supplied to the adder 8 so that the point B is moved to the point A. On the other hand, if the reactive power Q is equal to $Q_2$, the operating point of the generator is at a point C, and like in the case of the point B, the constant power factor operation is not maintained. In this case, since $Q_2 < Q_{ref}$, the functional block 72 issues the "increase excitation" command signal $\Delta V_2$ indicative of the amount of correction, as opposed to the previous case, so that the point C is moved to the point A. In the illustrated embodiment, the power factor cos $\phi_O$ can be readily changed by changing the resistance of the potentiometer VR of the functional block 72 or changing the gain of the inverter.

If an armature over-current condition occurs, the heating of the armature winding of the generator is prevented by minimizing $P^2+Q^2$, or by making the Q to be equal to zero. Accordingly, under the armature over-current condition, the function of preventing heating of the armature winding may be added by making the $Q_{ref}$ to be equal to zero.

The armature over-current compensation function is accomplished by automatically adjusting the potentiometer VR using a circuit comprising components 724 to 729, as shown in FIG. 7. Numeral 725 is a diode bridge circuit to receive and rectify an armature current $I_S$ detected by a current transformer CT as shown in FIG. 3. The output of the bridge circuit 725 is smoothened through a filter 726 to provide an electric signal I indicative of an armature winding current. The armature current signal I is compared by a comparator 728 with a predetermined current limit value $I_{ref}$ derived from a potentiometer 727. When the value I exceeds the limit value $I_{ref}$, a relay winding 729 is energized to close a contact 724 of the relay so that the $Q_{ref}$ value becomes zero.

Thus, the power factor regulation/armature overcurrent compensation functions can be achieved in a manner different from the prior art, namely, without using a vector operation.

Figure 10:
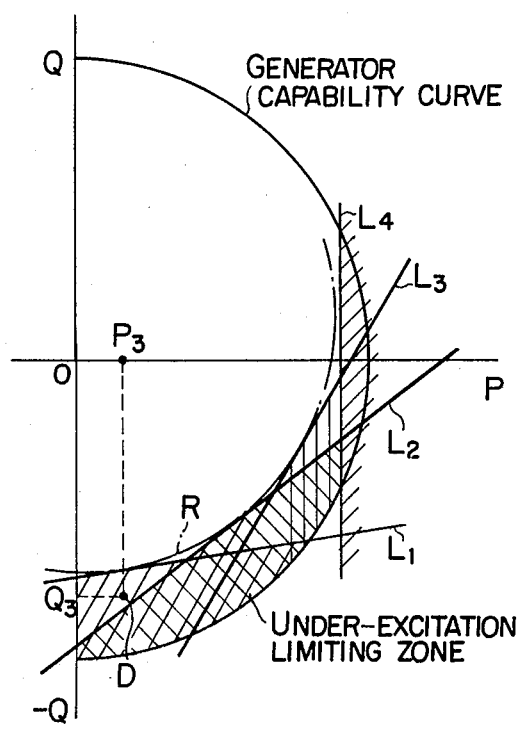
FIG. 10 is a diagram illustrating an under-excitation limiting function.
Figure 9:
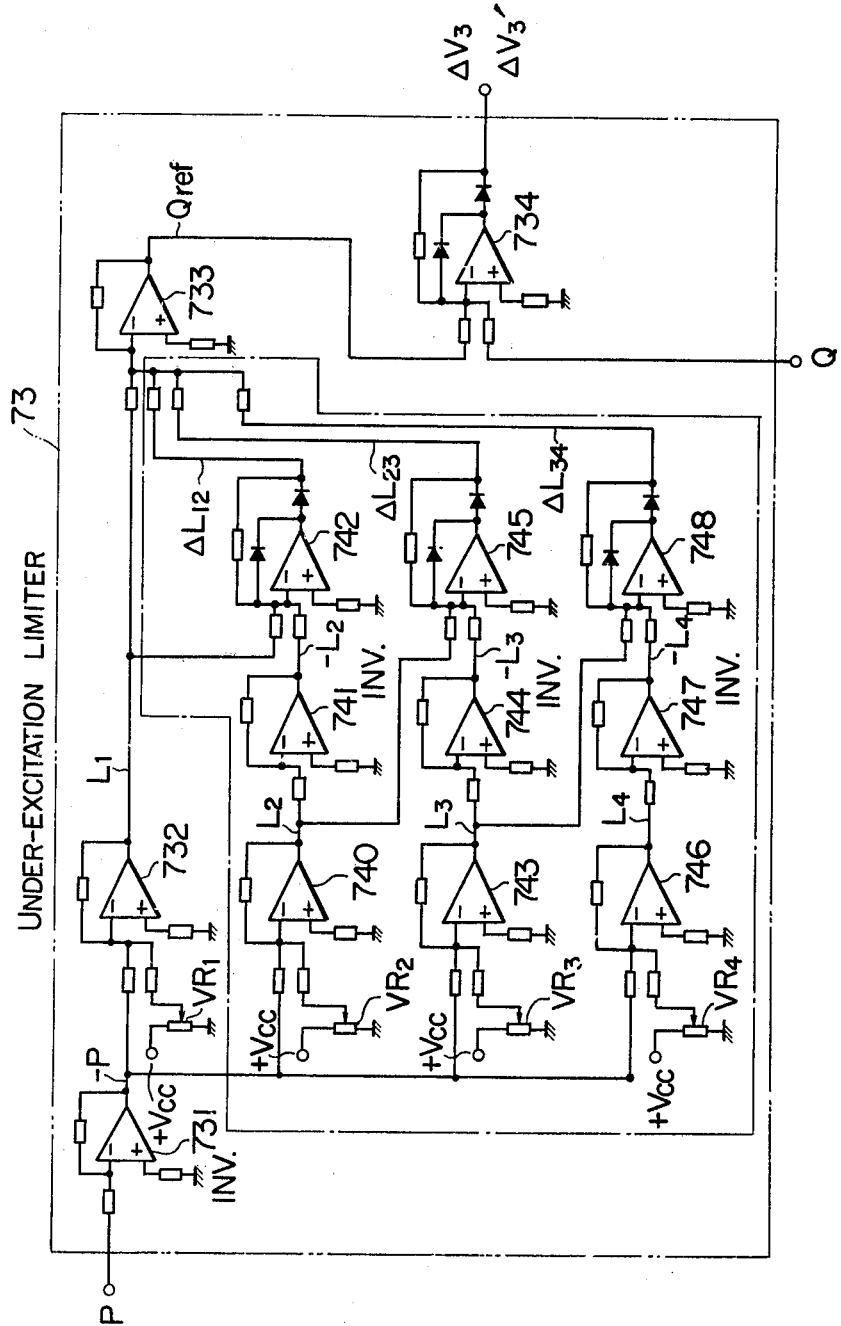
FIG. 9 shows a circuit configuration of an under-excitation limiter.

Functional block 73: It has an underexcitation limiting function for the generator. FIG. 9 shows a circuit configuration therefor and FIG. 10 illustrates the function. In FIG. 9, numerals 731, 741, 744 and 747 denote inverters each comprising an operational amplifier and resistors, numerals 732 to 734, 740, 742, 743, 745, 746 and 748 denote operation circuits each comprising an operational amplifier and resistors and/or diodes, and $VR_1$ to $VR_4$ denote potentiometers. The operation is explained below. The block 73 receives the active power signal P and the reactive power signal Q derived from the detector 6. The circuitry including the inverter 731, and the operation circuits 732 to 734 is first considered. The active power signal P is inverted to $-P$ by the inverter 731. The operation circuit 732 receives the inverted signal $-P$ and a reference voltage derived from the potentiometer $VR_1$ and calculates an underexcitation limiting line $L_1$ to a predetermined generator capability curve in FIG. 10 described later, by the following equation:

$$L_1 = a_1 P - b_1 \qquad (7)$$

where $a_1$ and $b_1$ are constants, and the reference voltage described above is determined in accordance with the under-excitation limiting line $L_1$ to the generator capability curve. The operation circuit 733 which receives the limiting line signal $L_1$ produces a $Q_{ref}$ in accordance with the limiting line $L_1$. The operation circuit 734 receives the signal $Q_{ref}$ and the reactive power signal Q derived from the detector 6 and produces a control voltage for the under-excitation limitation $\Delta V_3$ based on those signals by the following equation:

$$\Delta V_3 = K_3(Q_{ref} - Q) \qquad (8)$$

where $K_3$ is a positive constant. In this case, the operation circuit 734 produces the voltage $\Delta V_3$ only when it is positive. The diodes are included in the operation circuit 734 for this reason. Thus, the signal $\Delta V_3$ is positive and issued as the "increase excitation" command. FIG. 10 illustrates the condition described above. In FIG. 10, an abscissa represents the active power P, an ordinate represents the inactive power Q, a semi-circle represents a generator capability curve, R represents an ideal under-excitation limiting line, which is shown by a dotted chain curve, $L_1$ to $L_4$ represent under-excitation limiting lines, and a hatched area represents an under-excitation limiting zone. The under-excitation limiting lines $L_2$ to $L_4$ will be described later and they are not explained here. If the reactive power Q corresponding to any active power $P_3$ is equal to $Q_3$, the operating point of the generator is at a point D in FIG. 10, which is in a leading phase zone beyond the under-excitation limiting line $L_1$. Thus, the functional block 73 produces the control voltage $\Delta V_3$ described above to issue the "increase excitation" command so that the point D is moved to the under-excitation limiting line $L_1$ or into the lagging phase zone beyond the line $L_1$. The above explanation relates to a case where there is one underexcitation line. In actual, it is important to bring the under-excitation line close to the ideal under-excitation limiting line R in order to completely protect the under-excitation. Accordingly, the segment approximation for bringing the under-excitation limiting line close to the ideal under-excitation limiting line R is explained. First, limiting lines $L_2$ to $L_n$ ($n > 3$) similar to the limiting line $L_1$ are drawn to define a segment curve by n lines. FIG. 9 shows a configuration therefor, which attains the segment curve by four limiting lines $L_1$ to $L_4$, which are derived by the same way as that used for the limiting line $L_1$. The operation circuits 740, 743 and 746 receive the output $-P$ of the inverter 731 and the respective reference voltages derived from the potentiometers $VR_2$ to $VR_4$, respectively, and calculate the under-excitation limiting lines $L_2$, $L_3$ and $L_4$ in accordance with the following equations:

$$L_2 = a_2 P - b_2 \qquad (9)$$

$$L_3 = a_3 P - b_3 \qquad (10)$$

$$L_4 = a_4 P - b_4 \qquad (11)$$

where $a_2$ to $a_4$ and $b_2$ to $b_4$ are constants, and the reference voltages described above are determined in accordance with the respective under-excitation limiting lines $L_2$ to $L_4$, like in the case of the line $L_1$ stated above. The under-excitation limiting line signals $L_2$, $L_3$ and $L_4$ are inverted to $-L_2$, $-L_3$ and $-L_4$ by the inverters 741, 744 and 747, respectively. The operation circuit 742 receives the signals $L_1$ and $-L_2$, the operation circuit 745 receives the signals $L_2$ and $-L_3$, and the operation circuit 748 receives the signals $L_3$ and $-L_4$, and they produce differential signals $\Delta L_{12}$, $\Delta L_{23}$ and $\Delta L_{34}$, respectively, in accordance with the following equations:

$$\Delta L_{12} = L_2 - L_1 \qquad (12)$$

$$\Delta L_{23} = L_3 - L_2 \qquad (13)$$

$$\Delta L_{34} = L_4 - L_3 \qquad (14)$$

In this case, the operation circuits 742, 745 and 748 produce the output signals $\Delta L_{12}$, $\Delta L_{23}$ and $\Delta L_{34}$, respectively, only when they are positive. For this reason, the operation circuits 742, 745 and 748 include the diodes which constitute high level gates. Thus, the signals $L_1$, $\Delta L_{12}$, $\Delta L_{23}$ and $\Delta L_{34}$ are applied to the operation circuit 733, which calculate the signal $Q_{ref}$ in accordance with the following equation:

$$Q_{ref} = -(L_1 + \Delta L_{12} + \Delta L_{23} + \Delta L_{34}) \qquad (15)$$

In actual, the output signal $Q_{ref}$ given by the equation (15) is classified into the following four values for the active power P of the generator:

(i) When the active power is in the zone of $L_1 > L_2 > L_3 > L_4$, the left terms of the equations (12), (13) and (14) are negative and the outputs of the operation circuits 742, 745 and 748 are zero. That is, in the equation (15), $\Delta L_{12} = \Delta L_{23} = \Delta L_{34} = 0$. Thus, the output $Q_{ref}$ is given by:

$$Q_{ref} = -L_1 \qquad (16)$$

(ii) When the active power P is in the zone of $L_1 > L_2 > L_3 > L_4$, the left terms of the equations (13) and (14) are negative and the outputs of the operation circuits 745 and 748 are zero. That is, in the equation (15), $\Delta L_{23} = \Delta L_{34} = 0$. Thus, the output $Q_{ref}$ is given by:

$$Q_{ref} = -L_1 - \Delta L_{12} = -L_1 - (L_2 - L_1) = -L_2 \qquad (17)$$

(iii) When the active power P is in the zone of $L_1 > L_2 > L_3 > L_4$, the left term of the equation (14) is negative and the output of the operation circuit 748 is zero. That is, in the equation (15), $\Delta L_{34} = 0$. Thus, the output $Q_{ref}$ is given by:

$$\begin{aligned} Q_{ref} &= -L_1 - \Delta L_{12} - \Delta L_{23} \\ &= -L_1 - (L_2 - L_1) - (L_3 - L_2) = -L_3 \end{aligned} \qquad (18)$$

(iv) When the active power P is in the zone of $L_1 > L_2 > L_3 > L_4$, the left terms of the equations (12), (13) and (14) are all positive and the output $Q_{ref}$ is given by the equation (15). Thus, the output $Q_{ref}$ is given by:

$$\begin{aligned} Q_{ref} &= -L_1 - \Delta L_{12} - \Delta L_{23} - \Delta L_{34} \\ &= -L_1 - (L_2 - L_1) - (L_3 - L_2) - (L_4 - L_3) \\ &= -L_4 \end{aligned} \qquad (19)$$

As seen from (i) to (iv) above, the underexcitation limiting lines $L_1$ to $L_4$ appear depending on the value of the active power P and a segment curve approximating the ideal under-excitation limiting line R is formed as shown in FIG. 10.

The signal $Q_{ref}$ derived from the equations (16) to (19) and the reactive power signal Q derived from the detector 6 are applied to the operation circuit 734, which calculates a control voltage $\Delta V_3'$ based on the input voltages in accordance with the following equation:

$$\Delta V_3' = K_3'(Q_{ref} - Q) \qquad (20)$$

where $K_3'$ is a positive constant. The operation circuit 734 produces the output voltage $\Delta V_3'$ only when it is positive. Accordingly, the output $\Delta V_3'$ is issued as the "increase excitation" command. That is, the output $\Delta V_3'$ is applied to the adder 8 with a polarity to increase the excitation of the generator field.

While the segment curve shown comprises the four under-excitation limiting lines, the number of the under-excitation limiting lines may be increased or decreased when more accurate or less accurate approximation is desired. The circuit configuration therefor will be apparent to those skilled in the art when the circuit of FIG. 9 is referenced.

Figure 11:
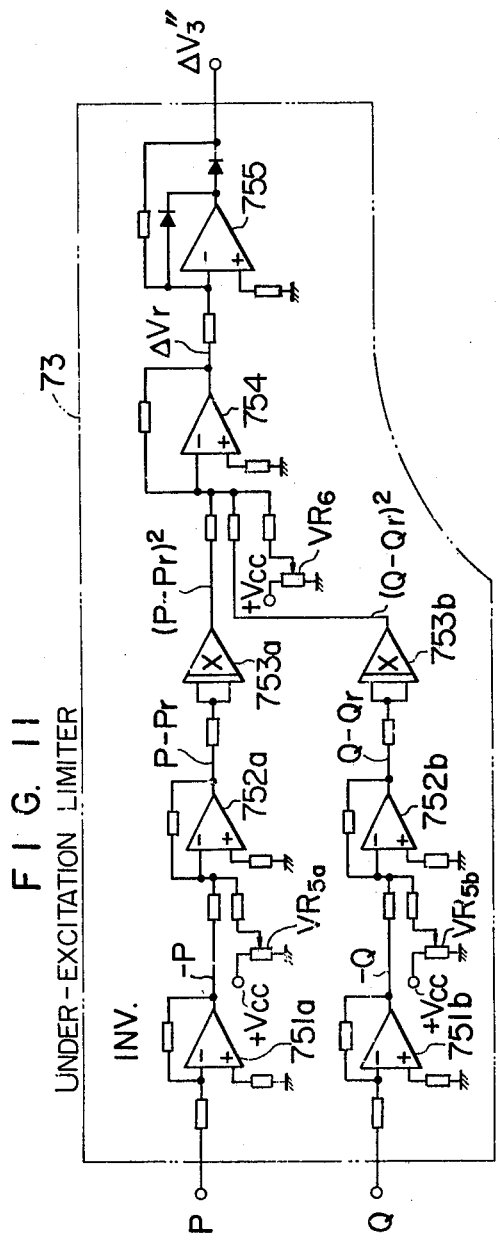
FIG. 11 is a circuit diagram showing another configuration of the under-excitation limiter.
Figure 12:
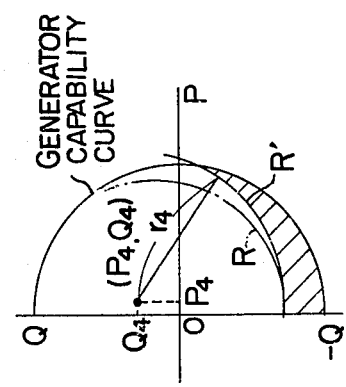
FIG. 12 illustrates the under-excitation limiting function.

Instead of constructing the functional block 73 by the segment approximation, it may be advantageously constructed by a circle approximation having a center point at an active power $P_4$ and a reactive power $Q_4$ of the generator, as described later with reference to FIG. 12. The circle approximation for the ideal under-excitation limiting line R is explained below. FIG. 11 shows a circuit configuration therefor and FIG. 12 illustrates the function. In FIG. 11, numerals 751a and 751b denote inverters each comprising an operational amplifier and resistors, 752a, 752b, 754 and 755 denote operation circuits each comprising an operational amplifier and resistors and/or diodes, 753a and 753b denote multipliers, and $VR_{5a}$, $VR_{5b}$ and $VR_6$ denote potentiometers. In FIG. 12, R denotes an ideal under-excitation limiting curve predetermined relative to the generator performance curve or capability curve. R' denotes an under-excitation limiting line attained by the functional block 73, and $P_4$ and $Q_4$ denote the coordinates of a center point for defining arcs of the under-excitation limiting line R'. While the ideal under-excitation limiting line R is shown by the arc in FIG. 12 (and FIG. 10), it is not an arc, in actual, because various factors due to the manufacturing processes of the generator are included. The operation is now explained. The block 73 receives the active power signal P and the reactive power signal Q derived from the detector 6. The active power signal P and the reactive power signal Q are inverted to $-P$ and $-Q$, respectively, by the inverters 751a and 751b. The operation circuits 752a and 752b receive the inverted signals $-P$ and $-Q$, respectively, and reference signals $P_4$ and $Q_4$, respectively, derived from the potentiometers $VR_{5a}$ and $VR_{5b}$, and the operation circuit 752a produces a signal $(P-P_4)$ while the operation circuit 752b produces a signal $(Q-Q_4)$. The reference signals $P_4$ and $Q_4$ are determined by the center points of the arcs constituting the desired approximate under-excitation limiting line R'. The multipliers 753a and 753b are constructed to produce square outputs of the input signals thereto. Thus, the multiplier 753a produces a signal $(P-P_4)^2$ while the multiplier 753b produces a signal $(Q-Q_4)^2$. The operation circuit 754 receives the signals $(P-P_4)^2$ and $(Q-Q_4)^2$ and a reference signal $r_4^2$ derived from the potentiometer $VR_6$ and calculates in accordance with the following equation:

$$\Delta V_{r4} = -(P-P_4)^2 - (Q-Q_4)^2 + r_4^2 \quad (21)$$

where $r_4^2$ is determined by a radius of the arc for the desired under-excitation limiting line R'. The operation circuit 755 produces an output $\Delta V_3''$ in accordance with the following equation:

$$\Delta V_3'' = (P-P_4)^2 + (Q-Q_4)^2 - r_4^2 \quad (22)$$

The operation circuit 755 produces the output $\Delta V_3''$ only when it is positive. Accordingly, the output $\Delta V_3''$ is produced only when the active power P and the reactive power Q of the generator satisfy the following equation and it indicates the "increase excitation" command:

$$(P-P_4)^2 + (Q-Q_4)^2 > r_4^2 \quad (23)$$

Accordingly, when the active power P and the reactive power Q are outside the arc R' in FIG. 12, that is, when they are in a zone beyond the arc R', the "increase excitation" command is issued to protect the under-excitation.

Figure 13:
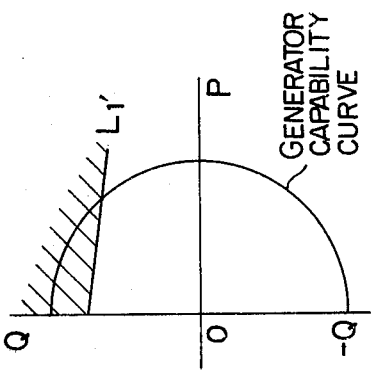
FIG. 13 illustrates an over-excitation limiting function.

Although an over-current limiting function for the generator, as opposed to the under-excitation limiting function, is included, it can be readily attained by reversing the polarity of the functional block 73 and hence it is not explained here. An over-excitation limiting line $L_1'$ which corresponds to the under-excitation limiting line $L_1$ shown above can be drawn as shown in FIG. 13, and when the active power P and the reactive power Q are beyond the over-excitation limiting line $L_1'$, that is, when they are in a hatched zone in FIG. 13, the functional block issues the "decrease excitation" command to limit the over-excitation. It should be understood that the segment approximation and the circle approximation described above may be applied as required.

Figure 14:
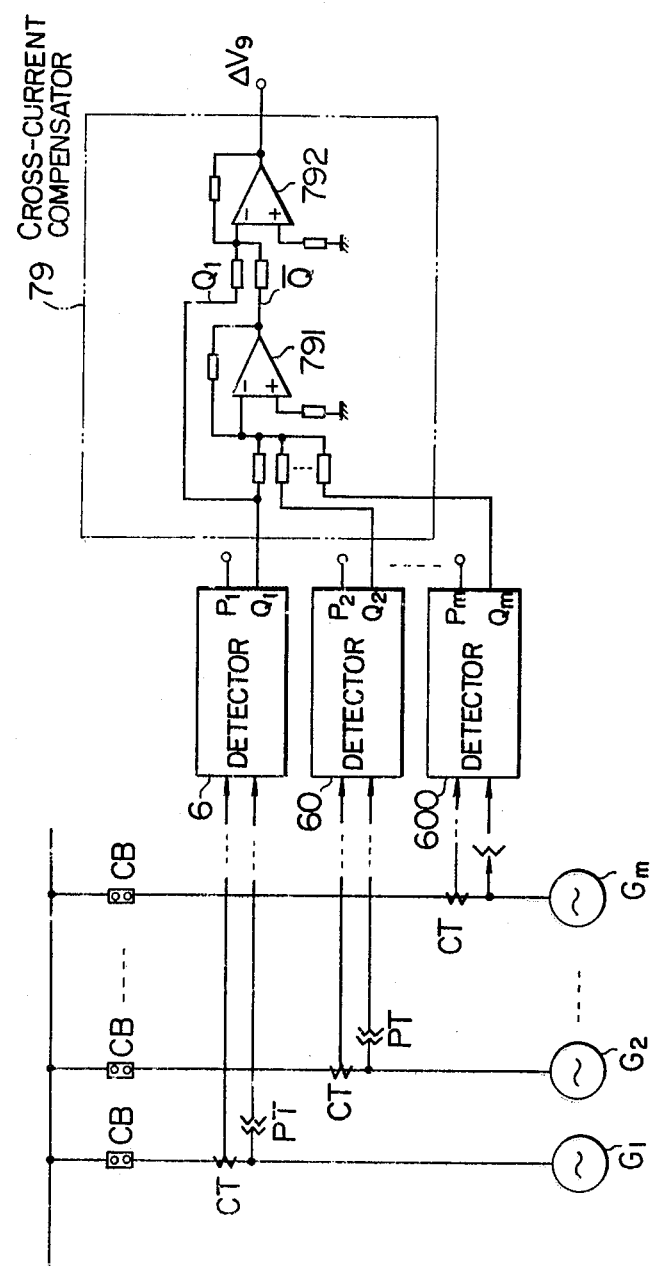
FIG. 14 shows a circuit configuration of a cross-current compensation unit.
Figure 15:
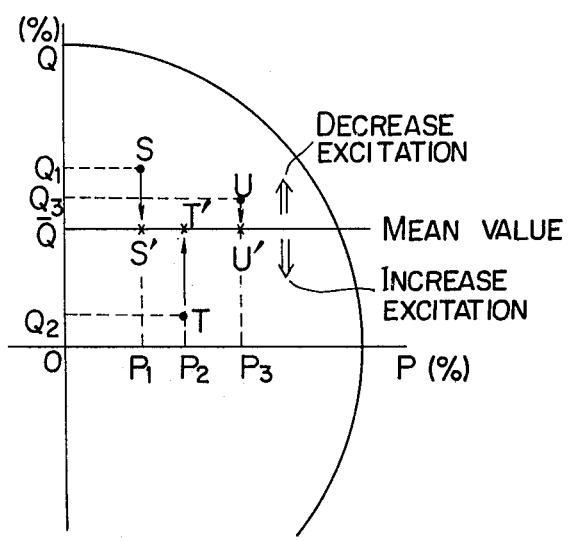
FIG. 15 illustrates a cross-current compensation function.

Functional block 79: It has a cross-current compensation function for suppressing a cross current between generators when a plurality of generators are connected in parallel in the generator system. FIG. 14 shows a circuit configuration therefor and FIG. 15 illustrates the function. In FIG. 14, $G_1$ to $G_m$ denote generators connected in the same system, and numerals 6, 60 and 600 denote detectors for detecting the active power P and the reactive power Q, which may be the same construction as that of the detector 6 described above. The block 79 comprises operation circuits 791 and 722 having adding function, each including an operational amplifier and resistors. The operation is now explained. The generators $G_1$ to $G_m$ connected in parallel in the system each has the excitation control apparatus as shown in FIG. 1. FIG. 14 shows that portion of the excitation control apparatus which is necessary to explain the operation of the block 79, that is, the detectors 6, 60 and 600 for the active power P and the reactive power Q. As shown, the block 79 receives the reactive power signals $Q_1$ to $Q_m$ from the respective generators. Based on those input signals, the operation circuit 791 calculates a mean reactive power $\overline{Q}$ of the parallel-connected generators in accordance with the following equation. It should be noted here that in the embodiment for cross-current compensation, the reactive power signal of the generator is represented by a percent value relative to a unit base of a rated reactive power of the generator:

$$\overline{Q} = \frac{1}{m}\left(\sum_{\substack{i=1 \\ i \neq j}}^{m} Q_i + Q_j\right) \quad (24)$$

where m is the number of parallel-connected generators, i is a generator number and j is a generator number of the corresponding generator. It is thus apparent that the right term of the equation (24) represents the mean reactive power $\overline{Q}$ of the parallel-connected generators. The operation circuit 792 receives the mean reactive power $\overline{Q}$ and the reactive power $Q_j$ of the corresponding generator and calculates in accordance with the following equation:

$$\Delta V_9 = \overline{Q} - Q_j \quad (25)$$

The voltage $\Delta V_9$ is a compensation voltage for suppressing the cross-current between the generators. When $\Delta V_9 > 0$, it functions as the "increase excitation" command, and when $\Delta V_9 > 0$, it functions as the "decrease excitation" command, and they are applied to the adder 8 of the excitation control apparatus for the j-th generator. The above operation is explained with reference to FIG. 15, in which the number of the parallel-connected generators is 3, that is, m=3. In the parallel operation of the generators, the generators having the same rating are usually used, but the operations are not always carried out under the same rating because of several factors. Taking the above into consideration, FIG. 15 shows an extreme situation for illustration purpose. Points S, T and U indicate operating points of the generators $G_1$, $G_2$ and $G_3$, respectively. In such a parallel operation, the cross-current between the generators is unavoidable. Accordingly, the reactive powers of the respective generators are moved from the points S, T and U to the points S', T' and U', respectively, by the cross-current compensation function so that the reactive powers of the respective generators become equal to each other. That is, based on the equation (25), the "decrease excitation" command is issued to the generators $G_1$ an $G_3$ and the "increase excitation" command is issued to the generator $G_2$ with the respective compensation quantity $\Delta V_9$.

Figure 16:
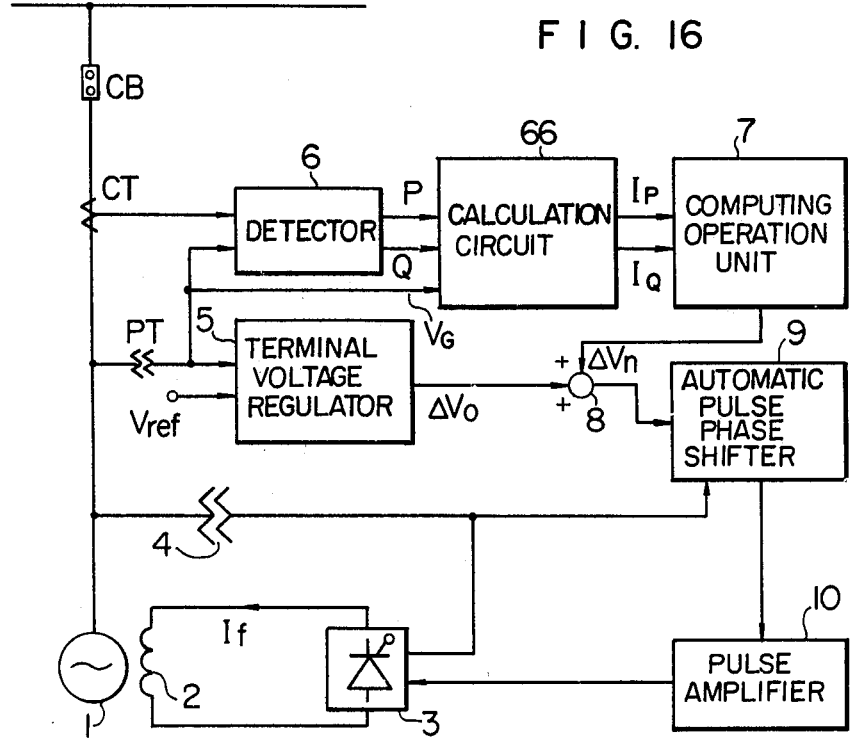

Referring to FIGS. 16 to 22, other embodiments of the present invention are explained. In FIG. 16, the operation for each function is carried out by an active current component $I_P$ and a reactive current component $I_Q$. In the explanation for FIGS. 1 to 15, the operation for each function was carried out based on the active power P and the reactive power Q. However, when the operation is carried out based on only the active power P and the reactive power Q, the relation thereof with a generator voltage $V_G$ is neglected. This is inconvenient when an influence by the voltage $V_G$ need be considered. In the present embodiment, the operation for each compensation/control function is carried out more really in a circumstance where the influence by the generator voltage $V_G$ is not negligible. Thus, in the present embodiment, the active component $I_P$ and the reactive component $I_Q$ of the armature current or generator current are calculated from the active power signal P and the reactive power signal Q derived from the detector 6 and the D.C. voltage $V_G$ derived by rectifying the generator terminal voltage detected by the potential transformer PT, and the operation for each of the compensation/control functions is carried out based on the resulting signals $I_P$ and $I_Q$. In FIG. 16, numeral 66 denotes a calculation circuit for calculating $I_P$ and $I_Q$, which may comprise a rectifier 660 and dividers 661 and 662, as shown in FIG. 20. It should be understood that the active component $I_P$ and the reactive component $I_Q$ of the current are calculated in accordance with the following equations:

$$I_P = P/V_G, \quad I_Q = Q/V_g \tag{26}$$

By carrying out the respective functions based on the $I_P$ and $I_Q$ thus calculated, the influence of the generator voltage $V_G$ can be taken into consideration so that more realistic compensation/control voltage can be obtained.

All of the functions to be carried out by the operation unit 7 need not be done based on $I_P$ and $I_Q$. As described above, the operation based on $I_P$ and $I_Q$ is effective only if the terminal voltage is intended constant by AVR control but the influence of the generator voltage $V_G$ is not negligible e.g., in the case of requiring a line drop compensation. If there is no need for considering the influence of the generator voltage $V_G$, the operation may, of course, be carried out based on the active power P and the reactive power Q. FIG. 17 shows an embodiment in accordance with the concept described above. In FIG. 17, numeral 70 denotes an operation unit which receives the outputs P and Q in scalar quantities from the detector 6 and the scalar outputs $I_P$ and $I_Q$ from the calculation circuit 66, as shown in FIG. 21. In this construction, the operation for each function can be carried out by selecting the inputs so that more realistic compensation/control voltage is obtained.

Figure 22:
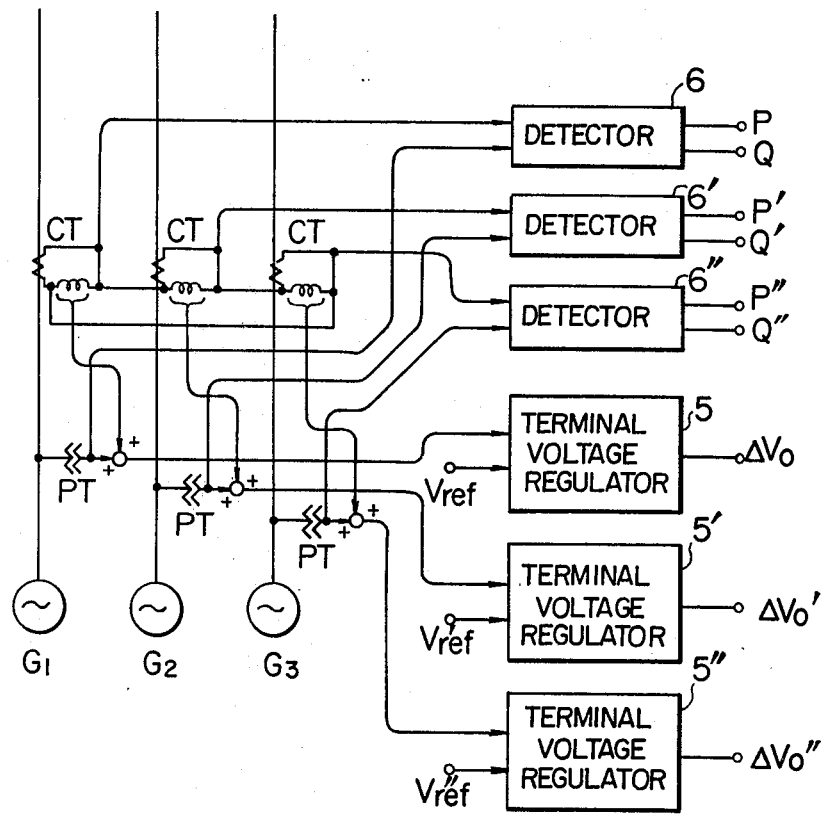

FIG. 18 shows another embodiment of the present invention, in which all of the operations for the respective functions are not carried out based on the outputs P and Q from the detector 6, but a portion of the operations is carried out by vector operation as is done in the conventional apparatus. It will be readily understood that the present embodiment is effective particularly when several functions are to be added to the existing line of impedance drop compensation unit 55 or an additional generator is to be connected in parallel to the parallel-connected generators which are compensated for the cross-current in a conventional manner. FIG. 22 shows an embodiment in which the cross-current compensation function is attained in the conventional manner and other functions are attained by the present invention based on the active power P and the reactive power Q. Of the various functions, the cross-current function should consider the situations of the other parallel-operated generators, and hence if the existing cross-current function is of a conventional type, it is better to control the additional generator in the same manner. In this case, it should be understood that the operation unit 7 may receive the signals $I_P$ and $I_Q$, or the signals P, Q, $I_P$ and $I_Q$, instead of the signals P and Q, as described above. FIG. 19 shows another embodiment in which the operation unit 7 receives the signals P, Q, $I_P$ and $I_Q$. In the present embodiment, there are provided the line drop compensation unit 55 which carries out the vector operation in the conventional manner and the operation unit 70 which carries out the scalar operation on the input signals P and Q derived from the detector 6 and the input signals $I_P$ and $I_Q$ derived from the calculation circuit 66 so that the compensation/control signals are obtained from both the line drop compensation circuit 55 and the operation circuit 70.

As described hereinabove, the present invention can provide a small-size, inexpensive multifunction excitation control apparatus for the generator. This is attained by providing the detector for detecting the active power P and the reactive power Q at the output of the generator or the calculation circuit for calculating the active component $I_P$ and the reactive component $I_Q$ of the current so that all of the circuits for attaining the respective functions can utilize the output signals P and Q from the detector or the output signals $I_P$ and $I_Q$ from the calculation circuit as common input signals. As a result, the respective functions can be attained by plug-in circuit modules and can be carried out by scalar operation. Furthermore, those modules can be implemented by semiconductor circuits including operational amplifiers. It is thus apparent that the present invention provides a significant advantage.

While several major compensation/control functions included in the excitation control apparatus have been described hereinabove, it should be understood that the present invention may be equally applied to carry out other necessary compensation/circuit functions so long as they are given as the function of the active power P and the reactive power Q, or the active component $I_P$ and the reactive component $I_Q$ of the current.

What is claimed is:

1. An excitation control apparatus for a generator having a terminal voltage regulating means for regulating a field current of the generator in accordance with a differential signal between a terminal voltage signal of the generator and a reference voltage signal, comprising:

detector means for detecting and providing outputs of a signal indicative of an active power component at an output of said generator and a signal indicative of a reactive power component thereof;

scalar operation means coupled to said detector means for carrying out a scalar operation in accordance with predetermined functions relative to the active and reactive power components, said scalar operation means including at least one of a means for computing a compensation value for a line drop voltage on the output side of said generator, a means for computing an under-excitation limiting value for said generator, a means for computing a regulation value for maintaining a constant power factor operation of said generator, a means for computing an overcurrent compensation value for an armature winding of said generator and a means for computing a cross-current compensation value for a cross-current between said generator and an additional generator connected in parallel thereto, at least one of said compensation/control value computing means being responsive to the common outputs from said detector means for carrying out the scalar operation in accordance with the corresponding specified function; and means for adding said compensation/control values from the output of said scalar operation means to the differential output from said terminal voltage regulating means.

2. An excitation control apparatus according to claim 1 wherein said detector means includes a potential transformer for detecting said terminal voltage, a current transformer and a detector for producing the active power component signal and the reactive power component signal from the outputs of said potential transformer and said current transformer.

3. An excitation control apparatus according to claim 2 wherein said detector means includes a means for calculating an active current component signal and a reactive current component signal based on the active power component signal and the reactive power component signal from said detector and the terminal voltage signal from said terminal voltage regulating means, an output of said calculation means being taken as an output of said detector means.

4. An excitation control apparatus according to claim 3 wherein said scalar operation means includes at least two compensation/control value computing means, at least one of which is responsive to the output from said active and inactive current component calculation means and the other of which is responsive to the active power component signal and the reactive power component signal from said detector.

5. An excitation control apparatus according to claim 2 further comprising a means coupled to said potential transformer and said current transformer for producing an impedance product with the generator terminal current to compensate for said terminal voltage signal.

6. An excitation control apparatus according to claim 5 wherein said detector means includes a means for producing an active current signal and a reactive current signal from the active power component signal and the reactive power component signal from the output of said detector and a D.C. voltage signal derived by rectifying the output of said potential transformer, and said scalar operation means includes at least two compensation/control value computing means, at least one of which is responsive to the output of said active and reactive current signal producing means and the other of which is responsive to the active power component signal and the reactive power component signal from said detector.

7. An excitation control apparatus according to claim 1, wherein said scalar operation means includes at least two compensation/control value computing means.

8. An excitation control apparatus according to claim 1, wherein said scalar operation means includes at least three compensation/control value computing means.

9. An excitation control apparatus according to claim 1, wherein said scalar operation means includes at least four compensation/control value computing means.

10. An excitation control apparatus according to claim 1, wherein said scalar operation means includes at least said means for computing a compensation value for a line drop voltage on the output side of said generator in accordance with the equation $\Delta V_1 = aP + bQ$ where $\Delta V_1$ is a line drop compensation voltage, P is the signal indicative of the active power component, Q is the signal indicative of the reactive power component, and a and b are amplification factors.

11. An excitation control apparatus for a generator having at least one auxiliary compensation/control function for the operation of the generator added to a terminal voltage regulating function for regulating a field current of the generator in accordance with a differential signal between a terminal voltage signal of the generator and a reference voltage signal, comprising:

a common signal detecting means for detecting and providing outputs of an active power signal and a reactive power signal from an output of a terminal voltage detector and an output of a terminal current detector; and means responsive to the output of said detecting means for carrying out a scalar operation on at least one auxiliary compensation/control function based on a function relationship specified for an active power and a reactive power at the output of said generator to produce a compensation/control signal being added to said differential signal.

12. A regulator system for an alternating circuit generator having a field excitation winding and output terminals connected to an electrical system comprising:

excitation means for supplying an excitation current to the field winding of the generator;

control circuit means connected to the input of said excitation means for controlling the magnitude of the excitation current supplied to the field excitation winding of the generator;

detector means for detecting and providing outputs of active and reactive power signals from the output of the generator in the form of scalar quantity;

compensation/control value determining means responsive to the output of said detector, for determining a compensation/control value for at least one operationally varying factor to be regulated in the generator depending on a predetermined function correlated with active and reactive power signals;

control signal generating means connected to the input of said control circuit, including first means for providing an output signal responsive to the difference between the output voltage of said generator and a reference voltage of predetermined magnitude and second means for summing the output signal of said first means and the compensation/control value as the output of said compensation/control value determining means.

13. The system according to claim 12, wherein said compensation/control value determining means comprises at least one of means for computing a line drop compensation value, means for computing an under-excitation limiting value, means for computing an over-excitation limiting signal, means for computing a power factor regulation value, means for computing a generator armature-winding overcurrent compensation value and means for computing a cross-current control value, each of said computing means producing an output as the compensation/control value in response to the scalar-valued active power and/or reactive power signal from the detector.

14. An excitation control apparatus for a generator having a terminal voltage regulating means for regulating a field current of the generator in accordance with a differential signal between a voltage signal from a terminal voltage of the generator connected in parallel with at least one other generator and a reference voltage, said voltage signal being compensated by a cross-current between the generators and an impedance, said control apparatus including at least one of means producing a control signal for limiting and under-excitation of the generator, means producing a control signal for limiting and over-excitation of the generator, means producing a control signal for maintaining a constant power factor operation of the generator, and means for producing a control signal for suppressing an over current of an armature winding of the generator, at least one of said signal producing means being responsive to active and reactive power signals of the generator for scalar-operating the magnitude of the control signal produced thereby, said control signal being added to the output of said voltage regulating means.

15. An excitation control apparatus of claim 14, further comprising common detector means for providing outputs of active and reactive power signals of the generator and wherein said control apparatus includes three of said signal producing means, each of said signal producing means being responsive to the active and reactive power signals of the generator and being selectively operated for producing the control signal.

16. An excitation control apparatus for a generator having a terminal voltage regulating means for regulating a field current of the generator in accordance with a differential signal from a voltage signal from a terminal voltage of the generator connected in parallel with at least one other generator and a reference voltage, said control apparatus including at least one of means producing a control signal for limiting an under-excitation of the generator, means producing a control signal for limiting an over-excitation of the generator, means producing a control signal for maintaining a constant power factor operation of the generator, and additional means for producing a control signal for compensating for a cross-current between the generators connected in parallel, at least one of said signal producing means being responsive to active and reactive power signals of the generator for scalar-operating the magnitude of the control signal, said additional signal producing means being responsive to the reactive power signals of the generators connected in parallel, the control signals of said signal producing means and additional signal producing means being added to the output of said voltage regulating means.

17. An excitation control apparatus according to claim 16, further comprising common detector means for providing outputs of active and reactive power signals of the generator, said control apparatus including all of said signal producing means and each of said signal producing means being responsive to the active and reactive power signals for scalar-operating the magnitude of the control signal produced thereby, said signal producing means and said additional signal producing means being selectively operated for producing a control signal.

* * * * *